United States Patent [19]

Stellaccio

[11] Patent Number: 4,666,463
[45] Date of Patent: May 19, 1987

[54] METHOD OF CONTROLLING THE TEMPERATURE OF A PARTIAL OXIDATION BURNER

[75] Inventor: Robert J. Stellaccio, Spring, Tex.

[73] Assignee: Texaco Inc., White Plains, N.Y.

[21] Appl. No.: 848,536

[22] Filed: Apr. 7, 1986

[51] Int. Cl.$^4$ .............................................. C10J 3/46
[52] U.S. Cl. .................... 48/197 R; 48/215; 122/6.6; 165/921; 239/13; 431/160
[58] Field of Search .................. 48/197 R, 206, 202, 48/215, DIG. 7, 209; 252/373; 239/13, 132.3; 165/921; 122/6.6, 7 R; 431/160

[56] References Cited

U.S. PATENT DOCUMENTS

| | | | |
|---|---|---|---|
| 2,838,105 | 6/1908 | Eastman et al. | 431/160 |
| 3,255,966 | 6/1966 | Hoffert et al. | 239/132.3 |
| 3,874,592 | 4/1975 | Buschmann et al. | 239/132.3 |
| 4,318,366 | 3/1982 | Tompkins | 165/921 |
| 4,443,230 | 4/1984 | Stellaccio | 48/197 R |

*Primary Examiner*—Peter Kratz
*Attorney, Agent, or Firm*—Robert A. Kulason; James J. O'Loughlin; Albert Brent

[57] ABSTRACT

The temperature of a burner in the reaction zone of a partial oxidation gas generator is controlled so that there is substantially no condensation of $H_2O$ from the hot raw product gas on the surface of the burner. Burner corrosion is thereby reduced. In the method, burner coolant is introduced into the burner at a pressure greater than that in the reaction zone and at a temperature in the range of about 5° to 50° F. higher than the dew point of the raw product gas contacting the burner in the reaction zone. The heated water coolant leaving the burner flows to a pressurized receiving vessel and its temperature is reduced by expansion into a feed vessel. Saturated steam is produced from a portion of the flashed water and is separated in the feed vessel for use as a heat source. Steam condensate is thereby produced and recycled to the feed vessel as make-up. The cooled liquid water coolant is then pumped into the inlet to the burner at a higher pressure than that in the feed vessel. This prevents raw product gas from leaking out of the gas generator by way of any break in the burner cooling water system. In another embodiment, the temperature of the heated water coolant leaving the burner is reduced by direct heat exchange with cooler make-up water.

20 Claims, 2 Drawing Figures

METHOD OF CONTROLLING THE TEMPERATURE OF A PARTIAL OXIDATION BURNER

FIELD OF THE INVENTION

This invention relates to a method for controlling the temperature of a fuel burner in a partial oxidation gas generator. More particularly it pertains to a method for controlling the temperature of the water coolant in order to prevent dew point corrosion of the burner.

The partial oxidation of a gaseous hydrocarbon fuel, liquid hydrocarbonaceous fuels such as petroleum products, or slurries of solid carbonaceous fuels such as coal and petroleum coke are well known processes. Typical burners for introducing the streams of reactant materials and temperature moderator into the gas generator are shown in the following coassigned U.S. Patents, which are incorporated herein by reference: U.S. Pat. Nos. 3,743,606; 3,758,037; 4,228,099; 4,443,228; 4,443,230; and 4,525,176.

The foreseeable trend for petroleum reserves is that the produced crude will be increasingly heavier and of poorer quality. Raw product gases produced in the gasifier comprise $H_2$, CO, $H_2O$, $CO_2$, and minor amounts of $CH_4$, $H_2S$, COS, $N_2$, and Ar. When moisture forms in the raw product gas stream, corrosion of the hot metal burner that is contacted by the raw product gas circulating in the gasifier may take place. By the subject invention the surface temperature of the burner is kept above the dew point of the raw product gas circulating in the reaction zone and corrosion of the metal burner is avoided or minimized. Further, the burner cooling water system is maintained at a pressure above the gasifier pressure so as to prevent any leakage of the raw product gas out of the gasifier by way of any failure (such as weld cracks) in the cooling water system.

SUMMARY OF THE INVENTION

In accordance with certain of its aspects, this invention is directed to a method for continuously controlling the temperature of a burner in a free-flow reaction zone of a gas generator for the partial oxidation of a gaseous hydrocarbon fuel liquid hydrocarbonaceous fuel or a slurry of solid carbonaceous fuel with a free-oxygen containing gas in the presence of a temperature moderator to produce in said reaction zone a hot raw gas stream substantially comprising $H_2$, CO, $CO_2$, $H_2O$, $H_2S$, COS, $CH_4$, $N_2$, and Ar said burner being equipped with cooling means and liquid water coolant inlet and outlet lines connected to said cooling means comprising:

(1) continuously removing from the cooling means of said burner by way of said outlet line a stream of heated liquid water coolant that was heated by indirect heat exchange with said hot raw gas stream contacting the outside surface of that portion of said burner within said reaction zone, and simultaneously introducing into said cooling means by way of said coolant inlet line a stream of liquid water coolant from (6); wherein substantially no $H_2O$ from said raw gas stream condenses on the external surfaces of that portion of said burner contained within said reaction zone;

(2) introducing said heated liquid water coolant from (1) into a receiving pressure vessel where the pressure is maintained above that in said reaction zone;

(3) passing a stream of water coolant from said receiving vessel into a cooling water feed pressure vessel;

(4) maintaining the pressure in said feed vessel below the pressure in said receiving vessel;

(5) removing saturated steam from said feed vessel at the saturation temperature corresponding to the pressure in the feed vessel, wherein said saturation temperature is above the dew point of said hot raw gas mixture;

(6) removing a stream of liquid water coolant from said feed vessel, increasing the pressure of said stream of coolant to above the pressure in the reaction zone, and introducing said stream of liquid water coolant into the burner inlet line as provided in (1) at a temperature in the range of about 5° F. to 50° F. above the dew point of said hot raw gas mixture in the reaction zone; and including the steps of either (7) mixing a stream of make-up water at a lower temperature with the heated liquid water coolant from the burner being introduced into the receiving vessel in (2) either prior to or within the receiving vessel thereby cooling the stream of heated liquid water coolant by direct heat exchange and forming a water coolant mixture, passing said water coolant mixture from said receiving vessel into said cooling water feed pressure vessel as provided in (3), wherein the temperature of the water coolant in said receiving and feed vessel is substantially the same, and removing a separate stream of liquid water coolant from the feed vessel; or (8) passing said stream of water coolant from said receiving vessel to said feed vessel as provided in (3) by way of an expansion means thereby converting a portion of said water into steam at a lower temperature prior to introducing said mixture of water and steam into the feed vessel at said lower temperature, and introducing into said feed vessel a stream of make-up water at substantially the same temperature as the temperature of the water in said feed vessel.

BRIEF DESCRIPTION OF THE DRAWING

In order to illustrate the invention in greater detail, reference is made to several embodiments as shown in the figures of the drawing wherein.

DESCRIPTION OF THE INVENTION

Figure 1:
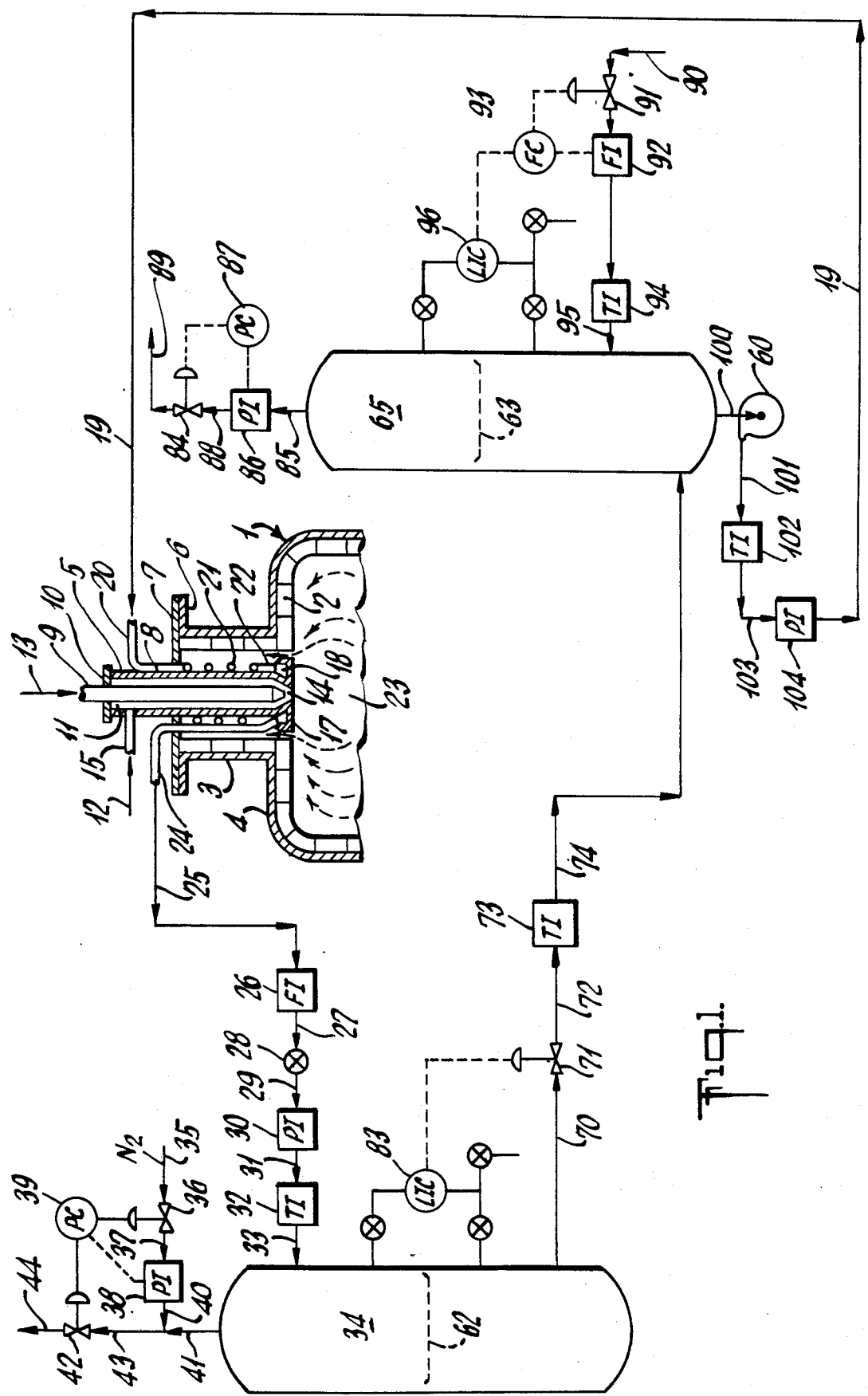
FIG. 1 is a high pressure system for cooling hot liquid water coolant from a burner in a partial oxidation process while simultaneously producing saturated steam.

The present invention pertains to a method for controlling the temperature of a burner in the partial oxidation gasifier for gaseous hydrocarbon fuel, liquid hydrocarbonaceous fuel, or slurries of solid carbonaceous fuel. A high pressure burner cooling water system is employed. In one embodiment, a comparatively large amount of saturated steam is produced. In another embodiment, there is produced a comparatively large amount of hot boiler feed water and a smaller amount of saturated steam in comparison with said first embodiment. The partial oxidation process for the production of synthesis gas, reducing gas, and fuel gas from low cost readily available, gaseous hydrocarbon fuel, solid carbonaceous fuels, and from liquid hydrocarbonaceous fuels is described in coassigned U.S. Pat. Nos. 3,069,251; 3,544,291; 3,998,609; 4,081,253; and 4,289,502, which are incorporated herein by reference.

The following solid carbonaceous fuels are suitable feedstocks for the partial oxidation process and include by definition: coal i.e. anthracite, bituminous, subbituminous, or lignite; particulate carbon; coke from coal; petrolum coke; oil shale; tar sands; asphalt; pitch; and mixtures thereof. The following liquid hydrocarbonaceous fuels are suitable feedstocks for the partial oxidation process and include by definition crude oil and heavy residua from the refining of petroleum such as (1) vacuum residuum and the asphalt residuum from solvent deasphalting, and (2) the bottoms product from the hydrogenation and hydrocracking of residua or heavy crude oil, petroleum distillates, tar sand oil, shale oil, coal derived oil, coal tar, cycle gas oil from fluid-catalytic-cracking operations, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof.

The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and rare gases).

In the partial oxidation process, solid carbonaceous fuel ground to a particle size range of about 1500 or less microns may be introduced into the gas generator either alone or in the presence of a substantially thermally vaporizable hydrocarbon and/or water, or entrained in a temperature moderator such as steam, $CO_2$, $N_2$ and recycle synthesis gas. Alternatively, liquid hydrocarbonaceous fuel may be introduced into the gas generator entrained in steam or one of the other aforesaid temperature moderators. Gaseous hydrocarbon fuels may be optionally reacted without a temperature moderator. Reaction of the fuel and a free-oxygen containing gas takes place in the reaction zone of the gas generator at a temperature in the range of about 1700° to 3000° F. and a pressure in the range of about 1-250 atmospheres, such as about 5 to 200 atmospheres. The atoms of free-oxygen containing gas plus the atoms of organically combined oxygen in the solid carbonaceous fuel to atoms of carbon in the fuel (O/C atomic ratio) may be in the range of about 0.7 to 1.6. The weight ratio of $H_2O$/fuel is preferably in the range of about 0.1 to 3.0.

Preferably, the burner for introducing the feedstreams into the reaction zone is mounted downward through a flanged inlet port located in the top of the gas generator along the central longitudinal axis. Typical burner installations are shown in the drawing and in coassigned U.S. Pat. Nos. 2,809,104; 3,255,966; 3,874,592; 3,847,564; 3,929,429; 4,479,810; 4,525,175; and 4,525,176 which are incorporated herein by reference. The hot raw product gas recirculates in the reaction zone thereby directly contacting and heating the external surfaces of the burner. Further, the face of the burner absorbs radiant heat from the reaction zone. The burner is provided with cooling means to prevent it from absorbing excess heat. Typical cooling means include one or more of the following: (1) cooling coils that spiral around the outside surface of the burner from the front to the rear and through which coolant such as liquid water is passed, such as shown and described in coassigned U.S. Pat. No. 3,847,564; (2) a hollow face plate at the tip of the burner through which liquid cooling water is passed, such as shown and described in coassigned U.S. Pat. No. 3,874,592; and (3) a concentric annular passage extending the length of the burner through which liquid cooling water is passed, such as shown and described in coassigned U.S. Pat. No. 3,255,966.

The partial oxidation gas generator comprises a vertical free-flow refractory lined steel pressure vessel, such as shown and described in coassigned U.S. Pat. Nos. 2,818,326; 2,871,114; 3,048,481; 3,998,609; 4,218,423; 4,289,502; 4,328,008; and 4,525,176, which are incorporated herein by reference.

It was found that the outside surface of burner parts that receive cooling water and which are contacted by hot raw product gas streams containing sulfur-containing gaseous impurities e.g. $H_2S$ and COS can suffer from dew point corrosion. This is because the cooling water causes condensation of the steam in the hot raw product gas on the outside surfaces of the burner. In accordance with the present invention, the burner tip cooling water system has been modified to allow the temperature and pressure of the water to increase. At a higher cooling water temperature, dew point corrosion is substantially decreased since less condensate will form on the surface of the cooled parts. When heat pick up in the cooling water system causes the water to heat up too much, the water can be cooled by the subject improved method of controlling the temperature of the partial oxidation burner. Further, the entering cooling water to the burner is at a temperature of about 5° F. to 50° F. above the dew point temperature of the raw gas stream in the reaction zone and at a pressure in the range of about 80 pounds per square inch (psi) to 400 psi, such as about 135 psi to 270 psi, higher than the pressure in the reaction zone of the gas generator. The dew point temperature of the raw gas stream in the gasifier is equal to a temperature in the range of about 225° F. to 515° F., such as about 310° F. to 400° F. The temperature of the coolant leaving the burner is in the range of about 10° to 80° F. higher than the dew point temperature of the raw gas stream in the reaction zone of the gas generator. The pressure drop of the cooling water across the burner is in the range of about 30 psi to 200 psi, such as about 60 psi to 120 psi. Accordingly, the pressure of the heated burner cooling water leaving the gas burner is in the range of about 50 psi to 200 psi higher than the pressure in the reaction zone of the gasifier.

DESCRIPTION OF THE PREFERRED EMBODIMENT

In practice of the process of this invention according to the best mode presently known for cooling hot liquid water coolant from burner 5 while simultaneously producing saturated steam, there is shown in FIG. 1 of the drawing a vertical free-flow steel cylindrical shaped pressure vessel or gasifier 1 lined with thermally resistant refractory 2 and having a vertical cylindrically shaped flanged inlet port 3 located in its top head 4 along the central longitudinal axis. A conventional annular type burner 5 is vertically mounted downward through inlet port 3. Burner 5 is coaxially mounted along the central longitudinal axis of gasifier 1 and held in place by bolting together ring flange 6 attached to the inlet port 3 and round plate flange 7 which is attached perpendicularly to the outside barrel member 8 of burner 5. Other members of burner 5 include central conduit 9 which passes through end plate 10 and is coaxial with vessel 1. Annular passage 11 is located between the outside surface of central conduit 9 and the inside surface of outside cylindrical member 8. Inlet pipe 15 discharges into annular passage 11. End plate 10 closes off the upstream end of annular passage 11 and centers conduit 9. Hollow face plate 17 is located at the downstream tip of burner 5 and is provided with annular core 18 for the passage of cooling water.

Liquid hydrocarbonaceous fuel entrained in a temperature moderator e.g. $H_2O$, $CO_2$, or a gaseous hydrocarbon fuel, or a slurry of solid carbonaceous fuel in line 12 is passed through inlet line 15 and annular passage 11 of burner 5. Simultaneously, a stream of free-oxygen containing gas, optionally in admixture with $H_2O$ is passed through line 13 and central conduit 9 of burner 5. Alternatively, the passages for the feedstreams may be interchanged. The feedstreams impact each other at the downstream burner outlet 14 and the fuel is atomized. The exothermic partial oxidation reaction takes place in reaction zone 23 of gas generator 1. The external surface of burner 5, especially face plate 17, is contacted by recirculating hot raw product gas.

The cooling water in line 19 at a temperature of about 5° to 50° F. above the dew point of the raw product gas in reaction zone 23 is pumped downward through inlet pipe 20, coils 21 that encircle outside cylindrical member 8, and into inlet 22 of face plate 17. The cooling water passes through annular core 18 and is heated by indirect heat exchange with the hot raw product gas recirculating on the outside of burner 5 or by the radiant heat coming from reaction zone 23 of gasifier 1. The heated water leaves core 18 through outlet pipe 24.

The heated burner cooling water leaves burner 5 at a temperature of about 10° to 80° F. above the dew point of the raw product gas in reaction zone 23 and passes through outlet line 25 and through rate of flow indicator and transmitter 26, check valve 28, line 29, pressure indicator and transmitter 30, line 31, temperature indicator and transmitter 32, and inlet line 33 into cooling water receiving pressure vessel 34. The pressure of the heated burner cooling water in outlet line 25 is greater than the pressure in reaction zone 23 of gasifier 1. This pressure difference may be in the range of about 50 psi to 200 psi, such as about 75 psi to 150 psi, higher than the gasifier pressure. By this means, should there be a rupture in that part of the burner cooling system within the gasifier then no raw product gas can escape from the reaction zone by way of said rupture.

An inert gas blanket pressure control system located at the top of receiving vessel 34 maintains the pressure in receiving vessel 34 above that in gasifier 1 and below the pressure of the circulating burner water coolant. For example, the pressure in receiving vessel 34 may be in the range of about 25 to 150 psi, such as about 50 to 100 psi higher than the gasifier pressure. In this instance, nitrogen in line 35 is used with pressure control valve 36 for controlling the passage of nitrogen through line 37, pressure indicator and transmitter 38 with associated pressure controller 39, lines 40 and 41 and into receiving vessel 34, when pressure control valve 42 in lines 43 and 44 is closed. When the pressure in vessel 34 is too high, then control valve 36 is closed, valve 42 is opened, and nitrogen in vessel 35 is vented to the atmosphere through lines 41, 43 and 44. In a steady state operation both valves 36 and 42 are closed. Pressure controlled receiving vessel 34 provides the back pressure on cooling water pump 60 and burner coils 21 that keeps the burner cooling system above the gasifier pressure. If a leak in the cooling coils develops then cooling water will leak into the gasifier. Such a leak will be detected by low flow on flow rate indicator and transmitter 26, a lower water level 62 in receiving vessel 34, and a lower water level 63 in pressure feed vessel 65.

Water is passed through line 70 near the bottom of receiving vessel 34 and flashed across an isenthalpic expansion means such as an isenthalpic or flashing control valve 71 to reduce its pressure to that needed to maintain the temperature of the water in feed vessel 65 about 5° to 50° F. above the dew point of the $H_2O$ in the raw product gas in gasifier 1. The flashing process will form steam and thereby lower the temperature of the steam-water mixture passing through line 72, temperature indicator and transmitter 73, and line 74 into pressure feed vessel 65. Thus, at least a portion e.g. from about 0.6 to 6.7 wt. %, such as about 1.0 to 2.5 wt. %, of the water in line 70 will be converted into steam. Simultaneously, the temperature of the remainder of the water in line 72 will be thereby reduced in the amount of about 5° to 30° F., such as about 10° to 25° F. The heat required to produce the amount of steam formed will theoretically equal the heat picked up in the burner cooling system i.e. the 5° to 30° F. rise in the temperature of the cooling water as it passes through the burner cooling system. The steam is subsequently removed from the system thus removing heat picked up by the burner.

Water level 62 in receiving vessel 34 is held within a prescribed range by signals from liquid level indicator and transmitter 83 to flashing control valve 71. Pressure control valve 84 at the top outlet in line 85 of feed vessel 65 will release the steam that is formed by way of pressure indicator and transmitter 86 with pressure control 87, and lines 88 and 89. This steam may be recycled for use as a portion of the temperature moderator in the gasifier. It may also be used in the plant as a source of heat, such as in small preheating duties. In one embodiment, at least one feedstream to the gas generator is preheated by indirect heat exchange with at least a portion of the steam from line 89. At least a portion, and preferably substantially all, of the condensate that is eventually formed from the steam is returned to feed vessel 65 by way of line 90, flow control valve 91, flow rate indicator and transmitter 92 with flow controller 93, temperature indicator and transmitter 94, and inlet line 95. The condensate is introduced into water feed vessel 65 at substantially the same temperature as the water in said feed vessel. Liquid level 63 in feed vessel 65 is held within a prescribed range by signals from liquid level indicator and transmitter 96 to flow rate controller 93 which then provides a signal to flow control valve 91.

In a steady state operation the amount of steam produced in line 72 and in feed tank 65 and removed through line 89 will substantially equal the amount of condensate returned to feed vessel 65 through line 90. Because steam is produced in the flashing stage, pressure control valve 84 will typically be open to let the steam flow out and to maintain the set pressure. The pressure controller is set at the pressure needed to boil water at the desired temperature of the burner cooling water entering burner 5 through line 19. This pressure is readily determined from steam tables for the properties of saturated steam, such as from Keenan and Keyes, "Thermodynamic Properties of Steam".

Water is removed through line 100 at the bottom of feed tank 65 and pumped by means of pump 60 through line 101, temperature indicator and transmitter 102, line 103, pressure indicator and transmitter 104, and line 19. By means of pump 60, the burner cooling water is pumped up to the pressure required for circulation through the burner cooling means e.g. cooling coils 21 and hollow face plate 17, and the introduction into receiving vessel 34 by inlet line 33.

Figure 2:
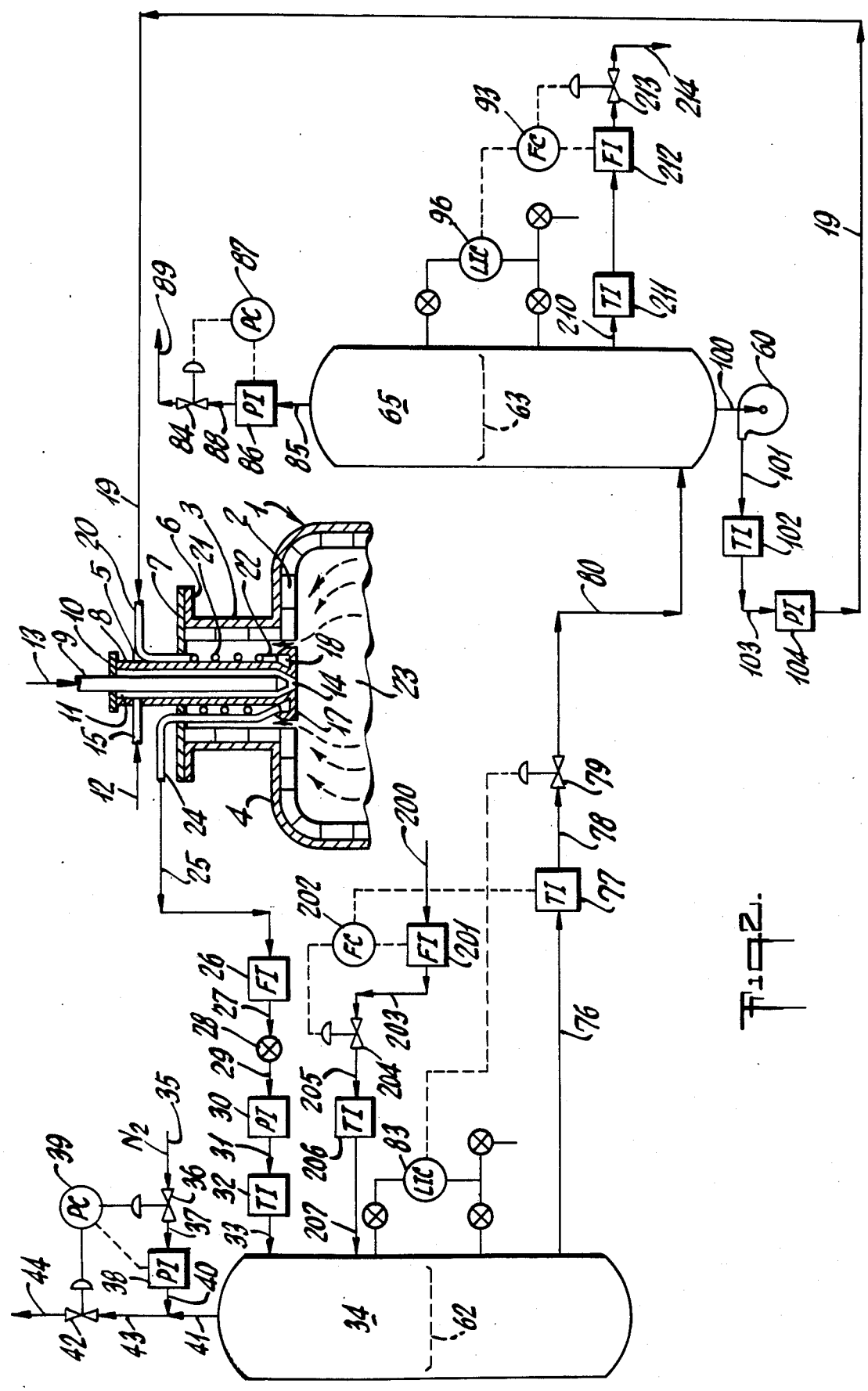
FIG. 2 is a high pressure system for cooling hot liquid water coolant from a burner in a partial oxidation process while simultaneously producing hot boiler feed water and a comparatively small amount of saturated steam.

Another embodiment of the subject invention is shown in FIG. 2. This is a method for cooling, while under high pressure, the hot liquid water coolant from a burner in a partial oxidation process while simultaneously producing hot boiler feed water and a comparatively small amount of saturated steam. Like the method described in FIG. 1, there is substantially no condensation of water vapor from the raw product gas recirculating on the outside surface of the burner. Two pressure vessels 34 and 65 are employed. The temperature of the water coolant in pressure vessels 34 and 65 is substantially the same. The pressure of the heated burner cooling water in outlet line 25 and receiving pressure vessel 34 is greater than the pressure in reaction zone 23 of gasifier 1. This pressure difference may be in the range of about 50 psi to 200 psi, such as about 75 psi to 150 psi higher than the gasifier pressure. By this means, should there be a rupture in that part of the burner cooling system within the gasifier then no raw product gas can escape from the reaction zone by way of said rupture.

In the manner described previously in connection with FIG. 1, an inert gas blanket pressure control system located at the top of receiving vessel 34 maintains the pressure in receiving vessel 34 above that in gasifier 1 and below the pressure of the circulating burner water coolant.

In this method, as shown in FIG. 2, heat is removed from the heated burner cooling water from line 25 by (1) direct heat exchange with comparatively cooler makeup water from line 200, flow rate indicator and transmitter 201, and flow rate controller 202, line 203, control valve 204, line 205, temperature indicator 206, and inlet line 207; (2) removing a small amount of saturated steam through lines 85, 88 and 89 above feed vessel 65; and (3) taking a hot water blowdown stream through line 210, temperature indicator 211, flow rate indicator and transmitter 212, control valve 213, and line 214. Blowdown water stream 214 may be used as boiler feed water since it has been preheated by cooling the burner tip. In effect, the makeup water to the receiving tank is heated from about ambient to the temperature of the cooling water fed to the burner by direct heat exchange with water that has been through the burner cooling means e.g. cooling coil and face plate. Thus, the stream of make-up water from line 200 at a temperature in the range of about ambient to 200° F., such as about 80° F. to 150° F., is mixed with the heated liquid water coolant from the burner at a temperature in the range of about 10° F. to 80° F., say about 25° F. to 60° F., above the raw gas dew point temperature in reaction zone 23 of gasifier 1 either prior to or within receiving vessel 34. By this means, the temperature of the water leaving vessel 34 has been cooled down about 5° F. to 50° F. by direct heat exchange. The small amount of steam produced in this method may be used in the plant low pressure steam system. An additional temperature controller is provided to maintain the mix temperature in the receiving tank at the temperature of the cooling water entering the burner cooling means by regulating the flow rate of the make-up water from line 200. Thus, based on the temperature of the water in line 76, a signal from temperature indicator and transmitter 77 in line 76 at the bottom of receiving vessel 34 is sent to flow rate controller 202 which provides a signal that opens or closes control valve 204 thereby regulating the rate of flow of the make-up water to receiving vessel 34 by way of line 200, 203, 205 and 207. The $H_2O$ in vessel 65 is discharged as follows: about 0.03 to 0.60 wt. %, such as about 0.25 to 0.50 wt. %, is converted into saturated steam and is vented through lines 85, 88, and 89 in the manner described previously for FIG. 1; about 1.3 to 15.0 wt. %, such as about 2.0 to 5.0 wt. %, hot water blow down stream through lines 210 and 214; and cooled burner cooling water in the amount of about 84.0 to 98.5 wt. %, such as about 94.0 to 97.0 wt. %, through lines 100, 101, and 19. The pressure in vessel 65 corresponds to the saturation temperature of the water in vessel 65. The saturation temperature is in the range of about 5° F. to 50° F. higher than the dew point of the raw gas stream in reaction zone 23 of gasifier 1. The other elements in the two systems shown in FIGS. 1 and 2 having the same reference numbers have the same function and perform in the same manner.

Advantages of the present invention are illustrated by the following specific examples. These examples are set forth for purpose of illustration and should not be construed as limiting the invention.

EXAMPLE I

With reference to the process shown in FIG. 1, a slurry of coal and water and a stream of free-oxygen containing gas are introduced into gas generator 1 by way of burner 5. The partial oxidation reaction takes place in reaction zone 23 at a temperature of 2456° F. and a total pressure of 614.7 psi. The composition of the raw synthesis gas produced in mole % follows: $H_2$ 26.80, CO 30.44, $CO_2$ 15.94, $H_2O$ 26.17, $H_2S$ 0.11, COS 0.009, $N_2$ 0.33, Ar 0.12, and $CH_4$ 0.07. The partial pressure of $H_2O$ in the raw synthesis gas in the reaction zone is 160.9 psia. From Keenan and Keyes "Thermodynamic Properties of Steam", this corresponds to a dew point in the reaction zone of 365.1° F.

About 45,732 lbs. per hour of heated cooling water from outlet line 25 of burner 5 at a temperature of 410° F. and a pressure 735 psi are introduced into receiving vessel 34 by way of inlet line 33. The liquid level 62 is maintained so that vessel 34 is about 50–80% full. Nitrogen gas from line 35 is introduced into vessel 34 to provide an internal pressure of about 710 psig. The pressure in receiving vessel 34 maintains the cooling water exiting from the burner at a pressure above the gasifier pressure. The partial pressure of $H_2O$ in vessel 34 is 276.7 psia.

About 45,732 lb/hr of water at a temperature of 410° F. and a pressure of 710 psig are passed through expansion means e.g. flashing level control valve 79. The pressure on the downstream side of valve 79 is thereby dropped to 232.6 psig. This is the pressure needed to maintain the temperature of the water in feed vessel 65 at 400° F. 400° F. is 34.9° F. above the dew point in reaction zone 23. The flashing process will form about 601 lb/hr of steam and will lower the temperature of the steam-water mixture to 400° F. The steam that is formed will be released by pressure controller 87 providing a signal to open valve 84. The steam is passed through line 89 into a heat exchanger where it passes in indirect heat exchange with a cooler stream. For example, the steam may be used to preheat a feedstream e.g. the coal-water slurry. All of the steam is thereby cooled below the dew point. About 601 lbs. per hour of the steam condensate are introduced into feed tank 65 by way of line 90 at a temperature of 400° F. Water level 63 is controlled so that feed vessel 65 is about 50-80% full.

About 45,732 lbs. per hour of cooling water from the bottom of feed vessel 65 at a temperature of 400° F. are pumped up to a pressure of 810 psig and introduced into inlet line 20 of burner 5. By means of the subject invention, the burner cooling water entering the cooling means of burner 5 e.g. hollow face plate 17 and coils 21 by way of line 19 is kept about 34.9° F. above the dew point in reaction zone 23 or at a temperature of 400° F. By this means condensation of the water vapor in the recirculating raw product gas in contact with the external surfaces of burner 5 does not take place. Corrosion of the metal burner is thereby substantially avoided. Further, the cooling water system is under a pressure which is greater than the gasifier pressure.

EXAMPLE II

With reference to the embodiment of the process shown in FIG. 2, raw synthesis gas having the same composition as specified in Example I is produced in gas generator 1 at a temperature of 2456° F. and a total pressure of 614.7 psi. The partial pressure of $H_2O$ in the raw synthesis gas in the reaction zone is 160.9 psia. The dew point in the reaction zone is 365.1° F.

About 45,732 lbs. per hour of heated cooling water from outlet line 25 of burner 5 at a temperature of 410° F. and a pressure of 735 psig are introduced into receiving vessel 34 by way of inlet line 33. Nitrogen gas from line 35 is introduced into vessel 34 to provide an internal pressure which is about 710 psig. The pressure in receiving vessel 34 maintains the cooling water exiting from the burner at a pressure above the gasfier pressure. The partial pressure of $H_2O$ in vessel 34 is 276.7 psia.

About 1613 lbs per hour of water such as boiler feed water at a temperature of 100° F. is introduced into receiving vessel 34 by way of inlet line 207. The two streams of water from lines 33 and 207 are mixed together in vessel 34. Liquid level 62 of vessel 34 is maintained so that vessel 34 is about 50-80% full. About 47,345 lbs per hour of water is removed from receiving vessel 34 by way of bottom outlet line 76 at a temperature of 400° F., past through level control valve 79, and are introduced into feed vessel 65.

The pressure in feed tank 65 is maintained at 232.6 psig by means of pressure controller 87 and pressure relief valve 84. 232.6 psig is the saturation pressure corresponding to saturated steam at a temperature of 400° F. 172 lbs per hour of saturated steam is removed through line 89 and used in the plant for heat exchange.

About 1441 lbs per hour of water at a temperature of 400° F. is removed through line 214 for use as boiler feed water. Level 63 is maintained so that feed vessel 65 is about 50-80% full.

About 45,732 lbs per hour of water at a temperature of 400° F. is removed through line 100 at the bottom of vessel 65, pumped up to a pressure of 810 psig by pump 60, and recycled to burner 5 where it enters coil 21 by way of line 19 as cooling water for the burner.

By means of the subject invention, the burner cooling water entering the cooling means of burner 5 e.g. cored face plate 17 and coils 21 by way of line 19 is kept about 34.9° F. above the dew point or at a temperature of 400° F. By this means condensation of the water vapor in the recirculating raw product gas in contact with the external surfaces of burner 5 does not take place. Corrosion of the metal burner is thereby substantially avoided. Further, the cooling water system is under a pressure which is greater than the gasifier pressure. Accordingly, there is no danger of explosive gas mixtures escaping and igniting, should there be a failure in the piping of the cooling water system.

Although modifications and variations of the invention may be made without departing from the spirit and scope thereof, only such limitations should be imposed as are indicated in the appended claims.

I claim:

1. A method for controlling the temperature of a burner in a free-flow reaction zone of a gas generator for the partial oxidation of a gaseous hydrocarbon fuel, liquid hydrocarbonaceous fuel, or a slurry of solid carbonaceous fuel with a free-oxygen containing gas and optionally in the presence of a temperature moderator to produce in said reaction zone a hot raw gas stream substantially comprising $H_2$, $CO$, $CO_2$, $H_2O$, $H_2S$, $COS$, $CH_4$, $Ar$ and $N_2$, said burner being equipped with cooling means and liquid water coolant inlet and outlet lines connected to said cooling means comprising:

(1) continuously removing from the cooling means of said burner by way of said outlet line a stream of heated liquid water coolant that was heated by indirect heat exchange with said hot raw gas stream contacting the outside surface of that portion of said burner within said reaction zone, and simultaneously introducing into said cooling means by way of said coolant inlet line a stream of liquid water coolant from (6); wherein substantially no $H_2O$ from said raw gas stream condenses on the external surfaces of that portion of said burner contained within said reaction zone;

(2) introducing said heated liquid water coolant from (1) into a receiving pressure vessel where the pressure is maintained above that in said reaction zone;

(3) passing a stream of water coolant from said receiving vessel into a cooling water feed pressure vessel;

(4) maintaining the pressure in said feed vessel below the pressure in said receiving vessel;

(5) removing saturated steam from said feed vessel at the saturation temperature corresponding to the pressure in the feed vessel, wherein said saturation temperature is above the dew point of said hot raw gas mixture;

(6) removing a stream of liquid water coolant from said feed vessel, increasing the pressure of said stream of coolant to above the pressure in the reaction zone, and introducing said stream of liquid water coolant into the burner inlet line as provided in (1) at a temperature in the range of about 5° F. to 50° F. above the dew point of said hot raw gas mixture in the reaction zone; and including the steps of either (7) mixing a stream of make-up water at a lower temperature with the heated liquid water coolant from the burner being introduced into the receiving vessel in (2) either prior to or within the receiving vessel thereby cooling the stream of heated liquid water coolant by direct heat exchange and forming a water coolant mixture, passing said water coolant mixture from said receiving vessel into said cooling water feed pressure vessel as provided in (3), wherein the temperature of the water coolant in said receiving and feed vessel is substantially the same, and removing a separate stream of liquid water coolant from the feed vessel; or (8) passing said stream of water coolant from said receiving vessel to said feed vessel as provided in (3) by way of an expansion means thereby converting a portion of said water into steam at a lower temperature prior to introducing said mixture of water and steam into the feed vessel at said lower temperature, and introducing into said feed vessel a stream of make-up water at substantially the same temperature as the temperature of the water in said feed vessel.

2. The method of claim 1 provided with the step of introducing at least a portion of the steam from (5) into said gas generator as at least a portion of said temperature moderator.

3. The method of claim 1 provided with the step of using at least a portion of the steam from (5) to preheat at least one feedstream to the gas generator while producing condensate.

4. The method of claim 3 provided with the step of introducing at least a portion of said condensate into said feed vessel as the make-up water in (8).

5. The method of claim 1 provided with the step of removing said heated cooling water from the cooling means in (1) at a temperature in the range of about 5.0° to 30° F. greater than the temperature of the liquid water coolant entering said burner.

6. The method of claim 1 provided with the step of removing said heated cooling water from the cooling means in (1) at a pressure which is about 50 to 200 psi above the pressure of the reaction zone of the gas generator.

7. The method of claim 1 provided with the step of maintaining the level of the liquid coolant in the receiving and feed vessels so that the vessels are filled to about 50–80% of their volumes.

8. The method of claim 1 wherein said expansion means is a flashing control valve.

9. A continuous method for reducing the temperature of a liquid coolant for a burner firing downwardly into a free-flow reaction zone of a gas generator for the partial oxidation of a gaseous hydrocarbon fuel, liquid hydrocarbonaceous fuel, or a slurry of solid carbonaceous fuel with a free-oxygen containing gas and optionally in the presence of a temperature moderator at a temperature in the range of about 1700° to 3000° F. and a pressure in the range of about 1 to 250 atmospheres to produce a raw gas stream substantially comprising $H_2$, CO, $CO_2$, $H_2O$, $H_2S$, COS, $CH_4$, Ar, and $N_2$ while preventing the condensation of $H_2O$ from said raw gas stream on the cooled external surfaces of said burner comprising:

(1) removing from said burner a stream of heated burner cooling water which was heated by indirect heat exchange with said raw gas stream to a temperature which is in the range of about 10° F. to 80° F. greater than the dew point temperature of said raw gas stream in the reaction zone and at a pressure which is about 50 psi to 200 psi higher than the pressure in the gas generator;

(2) introducing the heated burner cooling water from (1) into a water receiving vessel;

(3) maintaining the water pressure in said water receiving vessel at a pressure above the gasifier pressure, (4) passing water from said water receiving vessel through an isenthalpic expansion means thereby reducing its pressure and simultaneously converting at least a portion of said water into steam while cooling the remainder of said water about 5° F. to 30° F. below the temperature of the water in said receiving vessel and about 5° F. to 50° F. above the dew point temperature of the raw gas stream in the reaction zone;

(5) introducing the cooled water and steam from (4) into a water feed vessel;

(6) introducing make-up water into said water feed vessel at substantially the same temperature as the water in said feed vessel;

(7) removing saturated steam from said water feed vessel at the saturation temperature corresponding to the pressure in the feed vessel wherein said saturation temperature is about 5° F. to 50° F. above the dew point of the hot raw gas stream in contact with the outside of the burner in the reaction zone; and (8) increasing the pressure of at least a portion of the cooled water from said water feed vessel to a pressure which is about 80 psi to 400 psi greater than the pressure in said reaction zone, and introducing at least a portion of said cooled and pressurized water into said burner as a coolant at a temperature of about 5° F. to 50° F. above the dew point temperature of the raw gas stream in the reaction zone.

10. The method of claim 9 provided with the step of introducing at least a portion of the steam from (7) into said gas generator as at least a portion of said temperature moderator.

11. The method of claim 9 with the step of preheating at least one feedstream to the gas generator while producing condensate by indirect heat exchange with at least a portion of the steam from (7).

12. The method of claim 11 provided with the step of introducing at least a portion of said condensate into said water feed vessel as the make-up water in (6).

13. The method of claim 9 provided with the step of introducing nitrogen gas into said water receiving vessel to pressurize said vessel.

14. The method of claim 9 wherein said isenthalpic expansion means is a isenthalpic flashing control valve.

15. A continuous method for reducing the temperature of a liquid coolant for a burner firing downwardly into a free-flow reaction zone of a gas generator for the partial oxidation of a gaseous hydrocarbon fuel, liquid hydrocarbonaceous fuel, or a slurry of solid carbonaceous fuel with a free-oxygen containing gas and optionally in the presence of a temperature moderator to produce a raw gas stream substantially comprising $H_2$, CO, $CO_2$, $H_2O$, $H_2S$, COS, $CH_4$, Ar, and $N_2$ while preventing the condensation of $H_2O$ from said raw gas stream on the cooled external surfaces of said burner comprising:

(1) removing from said burner a stream of heated burner cooling water which was heated by indirect heat exchange with said raw gas stream to a temperature which is in the range of about 10° F. to 80°

F. greater than the dew point temperature of said raw gas stream in the reaction zone and at a pressure which is about 50 psi to 200 psi higher than pressure in the gas generator;

(2) introducing the heated burner cooling water from (1) into a water receiving vessel;

(3) mixing a stream of make-up water at a lower temperature in the range of about ambient to 200° F. with the heated water coolant from the burner either prior to or within the receiving vessel thereby cooling the stream of heated liquid water coolant by direct heat exchange to a temperature of about 5° to 50° F. above the dew point of the raw product gas in the reaction zone;

(4) maintaining the water pressure in said water receiving vessel at a pressure of about 25 to 150 psi above the gasifier pressure;

(5) passing water from said water receiving vessel through a liquid level control means and into a water feed vessel; wherein the temperature of the liquid water coolant in the receiving and feed vessels is substantially the same;

(6) removing a separate stream of liquid water coolant from the feed vessel;

(7) removing saturated steam from said feed vessel at the saturation temperature corresponding to the pressure in the feed vessel, wherein said saturation temperature is above the dew point of the hot raw gas stream in contact with the outside of the burner in the reaction zone; and (8) increasing the pressure of at least a portion of the cooled water from said water feed vessel to a pressure which is greater than the pressure in said reaction zone, and introducing at least a portion of said cooled and pressurized water into said burner as a coolant at a temperature of about 5°. to 50° F. above the dew point temperature of the raw gas stream in the reaction zone.

16. The method of claim 15 provided with the step of introducing at least a portion of the steam from (7) into said gas generator as at least a portion of said temperature moderator.

17. The method of claim 15 with the step of preheating at least one feedstream to the gas generator while producing condensate by indirect heat exchange with at least a portion of the steam from (7).

18. The method of claim 17 with the step of introducing at least a portion of said condensate into said receiving vessel as the make-up water in (3).

19. The method of claim 15 with the step of removing the heated cooling water from the burner in (1) at a temperature in the range of about 10° F. to 80° F. greater than the dew point of the raw gas stream in the reaction zone.

20. The method claim 15 with the step of introducing nitrogen gas into said water receiving vessel to pressurize said vessel.

* * * * *